Jan. 5, 1960   A. D. GRONNER   2,919,579
ELECTRICALLY-CONDUCTIVE LIQUID LEVEL MEASURING SYSTEM
Filed July 26, 1955
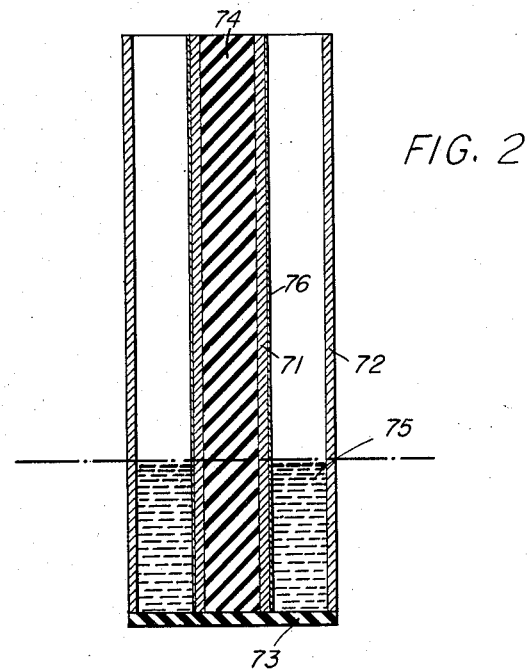
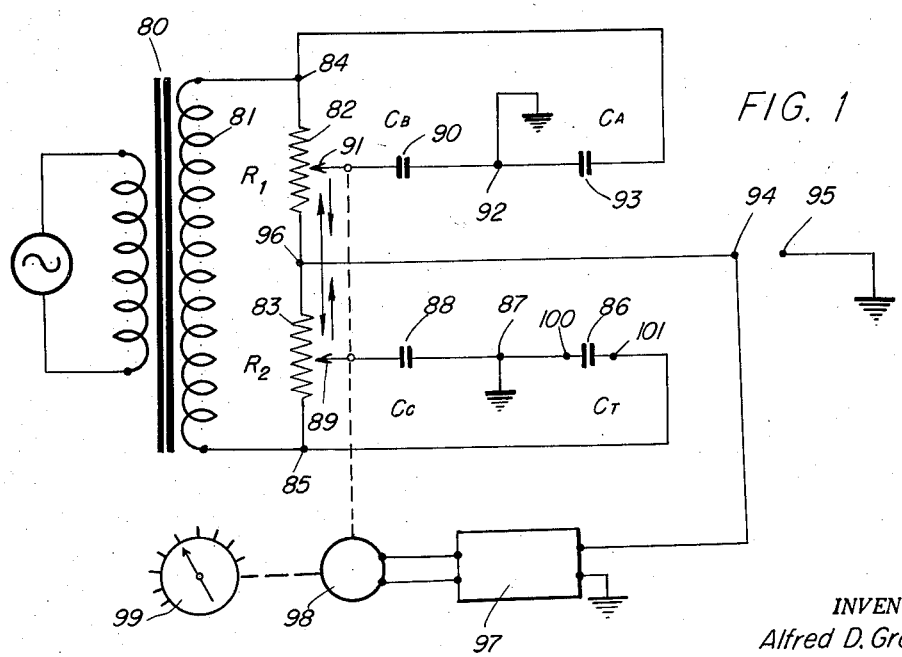
INVENTOR.
Alfred D. Gronner
BY
Attorney

United States Patent Office 2,919,579
Patented Jan. 5, 1960

2,919,579

ELECTRICALLY-CONDUCTIVE LIQUID LEVEL MEASURING SYSTEM

Alfred D. Gronner, White Plains, N.Y., assignor to The Liquidometer Corporation, Long Island City, N.Y., a corporation of Delaware Application July 26, 1955, Serial No. 524,540

6 Claims. (Cl. 73—304)

This invention is concerned with a liquid level measuring system. More specifically, it is concerned with a system for measuring the quantity of one of two immiscible liquids of different densities, which together substantially fill that portion at least of a container occupied by the liquid to be measured. One of the two liquids in such a case may be electrically conductive.

In certain methods of storing or carrying liquids where the useful liquid is lighter than water, it is stored in a container above a varying amount of water. This arrangement is particularly adaptable in transporting fuel oils or gasoline or the like in tankships, for example. The useful fuel, e.g. gasoline, is drawn off as water is pumped into the tank to replace the quantity of fuel that is removed. In tankships the water thus used is sea water, which may vary considerably in electrical conductivity but which is generally classed as an electrically-conductive liquid.

In order to measure the level of the cleavage line between two liquids of different densities, where one is an electrically-conductive liquid and the other is a non-conductive fluid, a system according to this invention may be employed, making use to some extent at least of the conductive properties of the one liquid. In other words, this invention is adaptable for use wherever a non-conductive fluid is supported on a conductive liquid where the properties of each are such that separation will be maintained between the two due to their being immiscible.

Heretofore the only systems available for sensing the interface or cleavage line between two liquids, and hence sensing the amount of one of these liquids in a tank, has been dependent upon one and one only of the liquids being electrically conductive, so as electrically to short out a portion of a resistor passing more or less vertically through both liquids. Such means, however, are subject to various practical objections and limitations. It is desired that a capacitive system similar, for example, to those now in common use in sensing the amount of liquid in tanks be usable for this purpose and be so arranged as accurately to indicate the amount of one of the two liquids in a container, preferably independently of the conductivity of either liquid layer.

Summarizing the present invention, therefore, it comprises a measuring capacitor extending more or less vertically throughout the area of the tank to be gauged, in which the two liquids (as oil and water) may occupy some complementary portions; i.e. this area is occupied by either or both liquids. In addition to this there are two capacitors which are disposed in one of these liquids, for example, in the oil, where it is desired to measure the amount of oil in an oil-water filled tank as set out hereinabove. Also there is a fourth capacitor which, from a broad point of view, may be a fixed capacitor; but where the utmost accuracy is desired, this fourth capacitor is in the other of the two liquids, i.e. in the water in the example given above. There is further provided an electrical bridge and a rebalancing and indicating system in which the principal measuring capacitor and one of the capacitors, which would be disposed in the oil in the example given, are energized by potentials of substantially equal magnitude, but of opposite phase or in any event so that the currents passing therethrough are equal in magnitude and opposite in phase so as to neutralize each other at the common circuit output when the measuring condenser is completely immersed in the same liquid as oil, in the example aforesaid. The other two capacitors, i.e. the other capacitor which is disposed in the oil layer, in the example given, and the capacitor which is either a fixed capacitor or is disposed in the water layer in the example given, are both energized by potentials which may be equal in a preferred embodiment of the invention, but in any event which are variable and are varied so as to balance the circuit between a minimum for both variable potentials as one extreme, and a maximum for both variable potentials as the other extreme. The bridge circuit is completed in a conventional manner by providing a bridge output connected through an amplifier to control a reversible motor, which is in turn mechanically connected to vary both variable potentials in a way so as to reduce the electrical output of the bridge substantially to zero and thereby to balance the bridge. The reversible motor is also connected to an indicator for indicating a value at which the bridge is balanced, this value being indicative of the amount of the liquid present which the system is arranged to measure, as the oil in the example given.

Certain embodiments of the invention are set forth below in compliance with the applicable statutes, and described with reference to the drawings, in which:

Fig. 1 is a circuit diagram illustrating a system for measuring the amount of one of two immiscible liquids of different densities, which together fill that portion at least of a container in which one of these two liquids, to be measured, is contained; and Fig. 2 is a diagrammatic view, substantially in central vertical section, of a measuring capacitor in which the inner electrode is coated with a non-conductive coating, so that the capacitor may be used in connection with electrically conductive liquids.

The liquid-level measuring systems according to this invention contemplate measurements where the electrically-conductive liquid may be water or similar liquids having relatively good conductive properties. Where extremely pure water is to be employed, the principles of the invention are not changed, but on account of the low conductivity of very pure water, some additional compensation arrangements may be desirable.

Fig. 1 illustrates the circuit for a system which employs a capacitive measuring element in connection with this invention. Before this circuit is explained, reference may be had to the schematic showing of a capacitive measuring element illustrated in Fig. 2. Such a capacitive element includes a capacitor having two conductive material electrodes, or plates 71 and 72. In the illustrated form these are concentric cylinders. These electrodes 71 and 72 are mounted on an insulating material base 73, and electrode 71 may be hollow or may have any convenient filler material 74 therein in order to conserve on the conductive material for electrode 71.

It is to be noted that whereas electrode or plate 72 is uncoated and comes directly into contact with the conductive liquid illustrated at 75, electrode 71 is not exposed for contact with the conductive liquid 75. There is a coating layer 76 which entirely covers electrode 71 and which has non-conductive properties so as to act as a dielectric.

Thus it will be observed that as the level of conductive liquid 75 varies between the plates of the capacitor unit, plate 72 where immersed is effectively shifted (electrically speaking) to within the separating distance of coating 76, over the area where conductive liquid 75 stands. In this manner the capacitive reactance of the capacitor element is varied from one extreme to another between the conditions of entire immersion of the element in the conductive liquid 75, to no immersion thereof. It is pointed out that in the absence of insulating coating 76 the capacitor element would be rendered useless by reason of the conductivity of conductive liquid 75, since this conductivity would create a short circuit that would kill any capacitance effect of the elements.

The circuit shown in Fig. 1 includes a bridge network having its energization supplied by a transformer 80 having a secondary winding 81. Connected across the secondary winding 81 there are two series-connected resistors 82 and 83. Joints 84 and 85 may be considered to constitute input points for the bridge circuit.

There is a measuring condenser element 86, which may be of the types shown in Fig. 2 and above described, connected between the input point 85 and an output point 87 which is grounded, as illustrated. There is a condenser 88 that has one electrode thereof connected to the output point 87, while the other electrode is connected to a slider contact 89 of a potentiometer comprising the resistor 83.

Symmetrically arranged on the other side of the bridge network there is a condenser 90 that has one electrode connected to a sliding contactor 91 of a potentiometer comprising the resistor 82; while the other electrode thereof is conected to an output point 92 that is grounded so as to be electrically the same as the point 87. In addition, there is a condenser 93 that has one electrode conected to the point 92; while the other electrode thereof is connected to the circuit input point 84. The bridge network output is connected to a pair of terminals 94 and 95, of which terminal 95 is grounded as illustrated, while terminal 94 is connected to a central point 96 located between the series-connected resistors 82 and 83.

The manner in which the bridge network operates is set out in detail hereinafter. The characteristics of the capacitors employed provide a compensation for any changes in electrical characteristics of the non-conductive fluid as well as for the electrically-conductive liquid.

The capacitor 86 is the measuring capacitor. This may take the form illustrated in Fig. 2, where the electrodes 71 and 72 will be connected to a pair of measuring capacitor terminals 100 and 101 in the Fig. 1 circuit. Capacitors 88 and 93 are preferably identical to capacitor 86, but with the space between their electrodes arranged always to be completely immersed in the non-conductive fluid. Capacitor 90 is a fixed capacitor preferably having a capacitance value equal to that of the measuring capacitor 86 when completely immersed in conductive liquid. A dielectric that is the same material as the coating on the measuring capacitor, e.g. coating 76, is preferably used in capacitor 90 for obtaining temperature compensation.

Should the conductive liquid be water that is quite pure, or another conductive liquid having a relatively high resistance and/or capacitive reactance component, the capacitor 90 is preferably identical with the measuring capacitor 86, but with its electrodes completely immersed in the pure water or other conductive liquid being measured. The reason for this is to gain the necessary compensation where the resistive and/or capacitive reactance component of the conductive liquid is sufficient to cause undue errors.

There is an amplifier 97 that has its input connected to the output of the bridge network, while its output is connected to drive a motor 98 that is mechanically connected to both sliding contacts 89 and 91 as illustrated. Motor 98 simultaneously positions these sliders in opposite directions along their respective resistance elements 82 and 83, as indicated by the arrows. There is also an indicator 99 mechanically connected to the motor 98, for indicating the level of liquid in accordance with the conditions of the bridge when balanced.

Operation of Fig. 1

As the level of the conductive liquid (e.g. 75 in Fig. 2) varies between the electrodes, or plates of the measuring capacitor 86, the capacitance value thereof is varied as pointed out above. This variable capacitance is compared with the capacitance of the capacitor 93 that is fixed in capacitance except for changes in the dielectric constant caused by use of different non-conductive fluids. The comparison being had by reason of the location of these two capacitors, which are on opposite sides of the bridge output terminals 87 and 92 (electrically the same point) so that if the capacitors 88 and 90 are disregarded and the resistors 82 and 83 are equal, the bridge will be unbalanced whenever these two capacitors (86 and 93) are not equal in capacitance. Rebalance of the bridge is accomplished by adding separately and simultaneously in variable degree each of the capacitors 88 and 90 to the capacitance of the capacitors 86 and 93 respectively. Such rebalance takes place as the potentiometer sliders 89 and 91 are simultaneously moved in opposite directions toward, or away from, the bridge output point 96.

In other words, by reason of the servo motor 98, the sliding contactors 89 and 91 of the two potentiometers will be adjusted to a zero or null condition which is located on the range of adjustments in the same proportion as the level of the conductive liquid. This will be evident from examining the limiting conditions which are as follows: (1) When the measuring capacitor 86 has no conductive liquid between its plates, the capacitance of capacitor 86 equals that of capacitor 93 as indicated above, and under these conditions the potentiometer slides 89 and 91 will be both electrically connected directly to the mid point 96 between resistors 82 and 83 so that capacitors 88 and 90 have no potential applied thereto and the bridge is balanced with a zero output. The sliders of the potentiometers are then both at their limit of travel toward one another. (2) When the other limiting condition exists the full potential is applied to capacitors 90 and 88, and they are effectively connected in parallel with capacitors 93 and 86 respectively. Under these conditions the bridge is again in balance because in each of the two capacitance legs thereof, there is the combined capacity of a capacitor equal to the capacity of the measuring capacitor when completely immersed in conductive liquid, plus that of a capacitor equal to the capacity of the measuring capacitor when completely in the non-conductive fluid, i.e. capacitor 90 plus capacitor 93, or capacitor 86 (now completely immersed in conductive liquid) plus capacitor 88. Thus, it is evident that the bridge circuit is in balance at both maximum and minimum limiting conditions. Furthermore, the balance at intermediate locations is had at adjustment positions of sliders 89 and 91 that are proportional to the portion of capacitor 86 which is immersed in conductive liquid.

While certain embodiments according to this invention have been described in considerable detail in accordance with the applicable statutes, this is not to be taken as in any way limiting the invention, but merely as being descriptive thereof.

It is claimed:

1. Capacitance-type fluid measuring apparatus for determining the quantity of a first of two immiscible liquids of different densities which together fill that portion at least of a container in which said first liquid is to be measured, and wherein at least one of said two liquids may be electrically conductive, said liquids existing in said container one above the other with a cleavage line therebetween, comprising a measuring capacitor having electrodes extending throughout the height to be measured and throughout both said liquids to the extent they exist in the space in said container represented by said height, one of said electrodes of said measuring capacitor being covered by an insulating material throughout said height; a first reference capacitor arranged to be always completely immersed in a representative sample of said first of said two immiscible liquids; means for supplying alternating currents respectively of opposite phase and from a common source to said measuring capacitor and to said first reference capacitor and therethrough respectively to a common circuit output point in such manner that when said two liquids are present in such amount in said container that said measuring capacitor is completely immersed in said first of said two liquids, the signals transmitted therethrough to said common output point will be substantially equal in magnitude and opposite in phase; a second reference capacitor which is always completely immersed in a representative sample of said first of said two liquids and which is connected between a source of variable alternating voltage connected to said common source and in phase with the voltage supplied to said measuring capacitor and said common circuit output point; a third reference capacitor having a capacitance which is predetermined in accordance with that which said measuring capacitor would have if it were filled with the second of said two immiscible liquids, means connecting said third reference capacitor between said common circuit output point and a source of variable alternating voltage connected to said common source and in phase with the voltage supplied to said first reference capacitor; a second circuit output point connected to and between said sources of variable alternating voltages; means subject to the existence and to the phase of the output voltage at said circuit output points for simultaneously varying the potentials of both said sources of variable alternating voltages between a minimum for both and a maximum for both, so as to balance the circuit and reduce said output voltage thereof substantially to zero; and means subject to the adjusted values of said variable voltages for indicating the quantity of said first of said liquids in the container.

2. Capacitance-type fluid measuring apparatus in accordance with claim 1, in which said measuring capacitor and said first reference capacitor are substantially similar to each other, so that when the voltages applied thereto are equal in magnitude and opposite in phase, and when said measuring capacitor is completely immersed in the same liquid in which said first reference capacitor is immersed, signals of equal magnitude and opposite phase will be transmitted to said common circuit output point.

3. Capacitance-type fluid measuring apparatus in accordance with claim 2, in which, when the container is filled with the same liquid in which said first reference capacitor is immersed, said variable alternating voltages will be both substantially zero, so that substantially no signals will be transmitted through said second and said third reference capacitors to said circuit output point.

4. Capacitance-type measuring apparatus in accordance with claim 1, in which, when said container is substantially filled with the liquid other than that in which said first and second reference capacitors are immersed, the circuit may be balanced by a maximum potential for each of said sources of variable alternating voltages to establish a condition of balance for the circuit such that the output signals through said measuring condenser and through said third reference capacitor to said common circuit output point will be substantially equal in magnitude and opposite in phase; while the signals to said circuit output point through said first and said second reference capacitors will be substantially equal in magnitude and opposite in phase.

5. Capacitance-type fluid measuring apparatus in accordance with claim 1, in which said third reference capacitor is constructed substantially the same as said measuring capacitor and is always totally immersed in the liquid in said container other than that in which said first and second reference capacitors are immersed.

6. Capacitance-type fluid measuring apparatus in accordance with claim 1, in which said two immiscible liquids are oil and sea water; and in which the amount of oil in said container is said first of said two liquids to be measured, and the quantity of which is to be indicated, said first and second reference capacitors being immersed in a representative quantity of the same oil, and said third reference capacitor being immersed in a representative quantity of said sea water.

References Cited in the file of this patent

UNITED STATES PATENTS

| | | |
|---|---|---|
| 829,161 | Kjerulff | Aug. 21, 1906 |
| 1,172,650 | Walton | Feb. 22, 1916 |
| 2,375,084 | Coroniti | May 1, 1945 |
| 2,738,673 | Campani | Mar. 20, 1956 |

FOREIGN PATENTS

| | | |
|---|---|---|
| 148,827 | Great Britain | Oct. 10, 1921 |
| 842,554 | Germany | June 30, 1952 |
| 1,058,592 | France | Nov. 4, 1953 |
| 1,082,713 | France | June 23, 1954 |